US012146357B2

(12) United States Patent
Salutzki et al.

(10) Patent No.: US 12,146,357 B2
(45) Date of Patent: Nov. 19, 2024

(54) FIRE PROTECTION SECURING DEVICE FOR SECURING A DOOR ACTUATOR

(71) Applicant: dormakaba Deutschland GmbH, Ennepetal (DE)

(72) Inventors: Thomas Salutzki, Ennepetal (DE); Thomas Pabst, Ennepetal (DE); Alexander Hellwig, Ennepetal (DE); Volker Bienek, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 120 days.

(21) Appl. No.: 18/016,761

(22) PCT Filed: Jul. 19, 2021

(86) PCT No.: PCT/EP2021/070147
§ 371 (c)(1),
(2) Date: Jan. 18, 2023

(87) PCT Pub. No.: WO2022/018026
PCT Pub. Date: Jan. 27, 2022

(65) Prior Publication Data
US 2023/0287723 A1 Sep. 14, 2023

(30) Foreign Application Priority Data
Jul. 20, 2020 (EP) .................................... 20186680

(51) Int. Cl.
*E05F 1/00* (2006.01)
*E05F 3/22* (2006.01)
*E06B 5/16* (2006.01)

(52) U.S. Cl.
CPC .............. *E05F 1/006* (2013.01); *E05F 3/227* (2013.01); *E06B 5/167* (2013.01);
(Continued)

(58) Field of Classification Search
CPC .......... E05F 1/006; E05F 3/227; E06B 5/167; E05Y 2900/134; E05Y 2600/626; E05Y 2800/414; E05Y 2800/416
See application file for complete search history.

(56) References Cited

U.S. PATENT DOCUMENTS

| | | | | |
|---|---|---|---|---|
| 4,847,946 A * | 7/1989 | Nam | E05F 3/221 | 16/53 |
| 5,551,187 A * | 9/1996 | Brouwer | E05F 1/006 | 49/1 |

(Continued)

FOREIGN PATENT DOCUMENTS

| | | | |
|---|---|---|---|
| EP | 3064684 A | | 9/2016 |
| JP | H10118208 A | | 5/1998 |
| KR | 20210155752 A | * | 12/2021 |

OTHER PUBLICATIONS

International Search Report for International Application PCT/EP2021/070147, International Filing Date Jul. 19, 2021 Date of Mailing Oct. 15, 2021, Translated Copy 2 pages.

*Primary Examiner* — Jeffrey O'Brien
(74) *Attorney, Agent, or Firm* — CANTOR COLBURN LLP

(57) ABSTRACT

A fire protection securing apparatus for securing a door actuator includes a retaining plate, designed for being secured to an assembly surface, in particular door, frame or wall, wherein, perpendicular to the retaining plate, an assembly axis is defined. The fire protection securing apparatus further includes an assembly plate which is secured to the retaining plate and which is designed for receiving the door actuator, and at least one closed reaction chamber arranged between the retaining plate and the assembly plate. The apparatus also includes a drive element of thermally intumescent material which is arranged in the reaction chamber and which is designed to push the assembly plate away from the retaining plate upon thermal activation.

14 Claims, 4 Drawing Sheets

(52) U.S. Cl.
CPC ....... *E05Y 2201/11* (2013.01); *E05Y 2600/51* (2013.01); *E05Y 2600/626* (2013.01); *E05Y 2800/414* (2013.01); *E05Y 2800/416* (2013.01); *E05Y 2900/134* (2013.01)

(56) References Cited

U.S. PATENT DOCUMENTS

| | | | | |
|---|---|---|---|---|
| 5,709,009 | A * | 1/1998 | Lasson | E05F 3/12 16/48.5 |
| 6,363,575 | B1 * | 4/2002 | Kaser | E05F 3/227 16/48.5 |
| 7,670,216 | B2 * | 3/2010 | Chilelli | E05F 3/227 454/195 |
| 7,698,796 | B1 * | 4/2010 | Dowling | E05F 3/227 29/402.08 |
| 8,756,759 | B2 * | 6/2014 | Kaestle | E05F 3/22 16/49 |
| 10,975,595 | B2 * | 4/2021 | Hickman | E05B 17/0075 |
| 11,725,445 | B2 * | 8/2023 | Hellwig | E05F 3/227 16/49 |
| 11,814,888 | B2 * | 11/2023 | Hellwig | E05F 1/006 |
| 2004/0098940 | A1 * | 5/2004 | Latessa | E06B 7/00 52/514 |
| 2014/0260929 | A1 * | 9/2014 | Leites | E05B 17/0075 89/1.14 |
| 2021/0388657 | A1 * | 12/2021 | Hellwig | E05F 3/227 |
| 2022/0186527 | A1 * | 6/2022 | Hellwig | E05F 3/227 |
| 2023/0027773 | A1 * | 1/2023 | Hellwig | F16B 31/007 |

* cited by examiner

FIRE PROTECTION SECURING DEVICE FOR SECURING A DOOR ACTUATOR

CROSS-REFERENCE TO RELATED APPLICATIONS

The present application is a 35 U.S.C. § 371 National Stage patent application of International patent application PCT/EP2021/070147 filed on 19 Jul. 2021, which claims priority to European patent application 20186680.3, filed on 20 Jul. 2020.

TECHNICAL FIELD

The disclosure relates to a fire protection securing apparatus for securing a door actuator. Furthermore, the disclosure discloses arrangements comprising a door actuator together with a fire protection securing apparatus.

BACKGROUND

Door actuators are used to close and/or open doors. In particular, door closers and door drives are designated as door actuators. In the case of the door closer, a spring storage mechanism is generally loaded by the manual opening movement. The energy stored in this case is used to close the door. In the case of the door drive, the door can be opened and/or closed automatically for example by means of electromechanics or hydraulics.

Door actuators are usually secured to an assembly surface, i.e. on the door leaf or the frame and/or the wall. In particular in the case of fire protection doors, it must be noted that flammable fluids, for example hydraulic oils, are often used in the door actuators. Suitable measures are used to as far as possible prevent the fluid in the door actuator from heating excessively and possibly igniting during a fire.

SUMMARY

The present disclosure indicates a fire protection securing apparatus for a door actuator, which enables the door actuator to be secured in an operationally-safe manner and at the same time meets security-related requirements, in particular for the event of a fire.

This is achieved by providing the features of the independent claim. The dependent claims have advantageous configurations of the disclosure as their subject matter.

The disclosure discloses to a fire protection securing apparatus for securing a door actuator. As mentioned at the outset, the door actuator is in particular a door closer or a door drive. Therefore, the fire protection securing apparatus according to the disclosure is designed in particular for securing a door actuator, in particular door closer or door drive, which generates a force to move a door.

The door actuator must be secured to an assembly surface by means of the fire protection securing apparatus described here. This assembly surface is formed in particular by a door, frame or wall. The door is in particular the door leaf. In the context of the disclosure, it is provided that the door actuator is mounted in particular on the side of the door facing away from the fire by means of the fire protection securing apparatus. In the event of a fire, an input of heat can occur through the door into the fire protection securing apparatus and into the door actuator. The fire protection securing apparatus is therefore designed such that it releases the door actuator from its assembly surface such that the door actuator can fall in particular to the ground. This prevents the door actuator from heating excessively and possibly igniting.

In particular, it is provided that the fire protection securing apparatus comprises a retaining plate and an assembly plate. The retaining plate and the assembly plate are connected on and to one another. The retaining plate is designed for being secured to the assembly surface, i.e. in particular the door, frame or wall. Perpendicular to the retaining plate or perpendicular to the assembly surface, an assembly axis is defined. The rear side of the retaining plate is in particular designed to bear directly against the assembly surface. The assembly axis is for example parallel to the screws, which are used to screw the retaining plate to the assembly surface. According to an alternative definition, the assembly axis is perpendicular to the driven axis of the door actuator. Via this driven axis, the door actuator is be connected, for example via a slide rail or a scissors linkage, to the door or frame and/or wall.

The assembly plate is in particular designed to receive the door actuator. It is in particular provided that the assembly plate is/will be connected only to the retaining plate, but not directly to the assembly surface. Furthermore, the assembly plate is designed to receive the door actuator, wherein it is in particular provided that the door actuator is connected only to the assembly plate, but not directly to the retaining plate or the assembly surface. This ensures that the door actuator, together with the assembly plate, falls from the retaining plate upon release of retaining plate and assembly plate. The retaining plate thereby remains on the assembly surface.

Furthermore, it is in particular provided that the fire protection securing apparatus has at least one closed reaction chamber. The at least one reaction chamber is located between retaining plate and assembly plate. In particular, the reaction chamber is formed by the retaining plate and/or the assembly plate. Furthermore, it is preferably provided that the reaction chamber is closed, as long as the assembly plate and the retaining plate are connected to one another. To this end, the reaction chamber has in particular two opposing bottoms, wherein one bottom is formed by a surface of the assembly plate and the other bottom is formed by a surface of the retaining plate. The two bottoms are opposite one another and are each in particular perpendicular to the assembly axis.

In a preferred configuration, the fire protection securing apparatus has a plurality of these closed reaction chambers. In particular, two, three, four, five, six, seven or eight of these reaction chambers are provided in the fire protection securing apparatus. For simplicity, the disclosure will be described mainly on the basis of one reaction chamber, wherein it is always intended that the plurality of reaction chambers are designed to be identical. However, the size of the reaction chambers can differ such that, depending on the geometric configuration of the fire protection securing apparatus, as many reaction chambers as possible with the largest possible surface can be used.

In particular, it is provided that a drive element is arranged in each reaction chamber. The drive element is manufactured from thermally intumescent material. The drive element is designed to increase its volume upon thermal activation, i.e. upon corresponding heating. This pushes the assembly plate together with the door actuator away from the retaining plate, substantially perpendicular to the assembly axis. The connection between retaining plate and assembly plate is configured such that they are thereby released such that the assembly plate can fall from the retaining plate. The retaining plate thereby remains on the assembly surface and the assembly plate together with the door actuator are released from the retaining plate.

The use of the retaining plate has the advantage that this mechanism functions regardless of the configuration, in particular stability, of the assembly surface. It is in particular considered that depending on the construction, structure and material of the respective door, a door-side support with respect to the expanding drive element cannot be given such that the assembly surface would yield and bend with respect to the high pressures of the intumescent material. Gaps and outlet openings would occur as a result, through which the intumescent material could escape uncontrolled without using the retaining plate according to the disclosure.

Furthermore, the retaining plate has the advantage that the screw connection between retaining plate and assembly plate does not play a role in the release of the door actuator in the event of a fire, since the retaining plate remains on the assembly surface. This is in particular advantageous since the fire protection securing apparatus can be used for different assembly surfaces and in this respect the quality, in particular strength, of the screw connection between retaining plate and assembly surface does not have to be fixed during the construction of the fire protection securing apparatus.

It is in particular provided that the thermally intumescent material of the drive element can be activated in a temperature range of 90° C. to 200° C.

It is preferably provided that the individual reaction chamber is formed by a pocket in the assembly plate open towards the retaining plate and/or by a pocket in the retaining plate open towards the assembly plate. In a preferred design, it is provided that the retaining plate is configured to be rigid, but as thin as possible. Accordingly, the reaction chamber is formed only by a pocket in the assembly plate. This pocket in the assembly plate is sealed by the retaining plate located thereon.

However, it is also provided that the respective reaction chamber is formed by a pocket in the retaining plate. This pocket is sealed by the assembly plate. It is equally possible to form the individual reaction chamber by a pocket in the assembly plate and a pocket in the retaining plate. The cross-section of these two pockets are then in particular identical in size and, as long as the retaining plate and the assembly plate bear against one another, together form the closed reaction chamber.

A depth is defined parallel to the assembly axis on the individual reaction chamber. If the reaction chamber is formed only by a pocket in the assembly plate, then 100% of the depth of the reaction chamber is positioned in the assembly plate. As explained, the reaction chamber can also be formed at least partially by a pocket in the retaining plate, wherein it is preferably provided that at least 50% of the depth, preferably at least 75% of the depth of the reaction chamber is positioned in the assembly plate. Therefore, the retaining plate can be configured to be as thin and visually pleasing as possible.

The retaining plate and the assembly plate bear in particular directly against one another and therefore contact one another. Thus, a contact surface is formed in each case in particular on the assembly plate and on the retaining plate. These contact surfaces bear against one another in the connected state of the two plates. In particular, the contact surface extends around each reaction chamber or each pocket such that the individual reaction chamber is closed all around. In particular, the reaction chambers are closed among themselves and are for example not connected to one another.

The retaining plate and the assembly plate are, as already described, connected to one another. To this end, at least one connecting element is preferably used. In particular, a plurality of these connecting elements is used. The connecting element is in particular a screw. The connecting element is configured such that it connects only the retaining plate and the assembly plate to one another, but no other elements, such as for example the assembly surface or the door actuator, would be incorporated into the connection. In particular, the connecting element is a countersunk screw, whose head is sunk into the retaining plate or the assembly plate.

The retaining plate preferably has first securing points, and preferably associated screws, for screwing onto the assembly surface. These first securing points are in particular through-holes. Particularly preferably it concerns holes for receiving screw heads, for example sunken holes for receiving a countersunk screw. Alternatively to the configuration as holes, the first securing points can also be formed by for example threaded rods.

Only the retaining plate is intended to be secured to the assembly surface via the first securing points, i.e. in particular the screws inserted into the first securing points. The assembly plate is not incorporated into this securing process. To this end, it is in particular provided that the assembly plate has at least one recess. In particular, one recess is provided for each first securing point. The respective first securing point of the retaining plate is accessible via the recess. In particular, the recess is designed such that it does not receive screw heads such that a screw can be introduced through the recess until the screw head bears against the first securing point without thereby connecting the assembly plate. The recess is in particular a correspondingly large through-hole.

The assembly plate also has securing points, which are designated here as two securing points, for screwing on the door actuator. The second securing points are in particular holes with an inner thread. Alternatively, these securing points could for example be threaded rods. The second securing points are designed such that the door actuator can be secured to the assembly plate, wherein this securing process does not incorporate other elements, in particular the retaining plate or the assembly surface.

It is also possible that the assembly plate is fixedly connected to the door actuator, for example an integral part of the housing of the door actuator. In particular, the assembly plate then cannot be released from the door actuator without it being destroyed. However, in the case of this configuration, it must be noted that the first securing points must be accessible for securing the retaining plate to the assembly surface, in particular for inserting screws. For example, due to this accessibility of the first securing points, in most cases the practical solution is that the door actuator is screwed onto the assembly plate. As a result, the entire fire protection securing apparatus can first be secured to the assembly surface, whereupon, in the next step, the door actuator is secured on the fire protection securing apparatus, i.e. the assembly plate.

The assembly plate is preferably in one piece, in particular of metal. Similarly, the retaining plate is preferably in one piece, in particular of metal. As a result, simple manufacture and a non-burning and stable configuration of these plates emerges.

The dimensions of the retaining plate and the assembly plate extending perpendicular to the assembly axis are configured to be the same size as far as possible. As a result, these two plates can bear against one another over an area that is as large as possible and the corresponding securing points can be distributed over an area that is as large as possible. Furthermore, a uniform and visually pleasing shape emerges. It is in particular provided that the retaining plate extends perpendicular to the assembly axis over a first cross-sectional area and the assembly plate extends perpendicular to the assembly axis over a second cross-sectional area. In particular, a ratio of the first cross-sectional area to the second cross-sectional area is between 0.7 and 1.3, preferably between 0.8 and 0.9, particularly preferably between 0.9 and 1.1.

Parallel to the assembly axis, a thickness of the retaining plate is defined at its thickest point. This thickness of the retaining plate is preferably between 1 mm and 20 mm, particularly preferably between 2 mm and 10 mm.

Parallel to the assembly axis, a thickness of the assembly plate is defined at its thickest point. The thickness of the assembly plate is preferably between 1 mm and 30 mm, preferably between 5 mm and 20 mm.

It is preferably provided that in the individual reaction chamber, only the intumescent material is arranged without other parts. The drive element or the intumescent material is in particular a flat, plate-shaped material, which can be cut to any desired length. It is in particular provided, in order to achieve a design that is as flat as possible, that only one layer of this plate-shaped material is laid for each reaction chamber.

The drive element preferably extends over the entire cross-sectional area of the reaction chamber defined perpendicular to the assembly axis. As a result, the entire reaction chamber is filled with the drive element and as much of the intumescent material as possible is available.

The individual reaction chamber has a cross-sectional area perpendicular to the assembly axis. This cross-sectional area of the reaction chamber is preferably at a right angle since, in the case of this geometric configuration, as many reaction chambers or reaction chambers with large surface as possible can be distributed over the fire protection securing apparatus. However, other cross-sectional areas are also possible.

The fire protection securing apparatus is designed to be as flat as possible and is shaped as far as possible such that it can be arranged unobtrusively between door actuator and assembly surface. The depth of the individual reaction chambers is preferably between 1 mm and 15 mm, in particular between 2 mm and 10 mm.

Perpendicular to the assembly axis, the cross-sectional area of the individual reaction chamber is defined. It is preferably between 400 $mm^2$ and 50000 $mm^2$; preferably between 900 $mm^2$ and 10000 $mm^2$.

When a plurality of reaction chambers is used, the total of all cross-sectional areas is also of interest since, through an entire cross-sectional area that is as large as possible, correspondingly as much force can be applied to push away the door actuator. Thus, the total of all cross-sectional areas of all reaction chambers is preferably at least 2500 $mm^2$, in particular at least 5000 $mm^2$.

The disclosure also comprises an arrangement with a door actuator and the previously described fire protection securing apparatus. The door actuator is designed to be arranged on the assembly plate, in particular to be screwed onto the assembly plate. The door actuator is particularly preferably screwed onto the assembly plate. The door actuator is in particular a door closer or a door drive. In particular, the door actuator has a housing, for example of pressure die-casting. In particular, at least one hydraulic chamber, in which the flammable fluid is located, is located in the housing.

The advantageous configurations described in connection with the fire protection securing apparatus according to the disclosure and dependent claims are applicable accordingly in an advantageous manner for the arrangement.

In particular, it is provided that the arrangement comprises a covering, which covers the door actuator. The covering is in particular designed for being directly secured to the assembly plate. In particular, the assembly plate has, at at least one point, a form-locking contour, which is designed for receiving the covering in a form-locking manner. In particular, the assembly plate and the covering are designed such that the covering covers the assembly plate such that the assembly plate is not visible externally or at least not fully visible at its circumference. As a result, only the retaining plate, which is, however, configured to be relatively thin, is visible.

The disclosure also comprises a door arrangement. The door arrangement in turn comprises the arrangement just described and also the assembly surface. In particular, the door arrangement comprises the door, frame or wall which forms the assembly surface. The retaining plate is designed for being secured to the assembly surface. In particular, the retaining plate is secured, preferably screwed, to the assembly plate.

In summary, the disclosure discloses a fire protection securing apparatus, which can fulfill an effective separating function of the door actuator regardless of the structure of the assembly surface. This is achieved by the division into two functional levels, i.e. the retaining plate and the assembly plate. As a result, a conventionally used assembly plate can in particular be replaced. The assembly-side securing takes place using a very rigid retaining plate, which ensures the securing to the assembly surface and at the same time represents a very robust support for the intumescent material. The retaining plate also remains on the assembly surface even after the separation of the door actuator, but does not represent an ignition hazard due to the choice of material, in particular metal.

The connection between the two functional levels, i.e. the connection between retaining plate and assembly plate, is assumed by correspondingly selected connecting elements, which engage into precisely defined thread for a defined strength. Therefore, on the one hand, the transmission of the operating forces from the door actuator to the assembly surface is ensured, but at the same time a secure release of retaining plate and assembly plate is also possible in the event of a fire. A further advantage of the disclosure is that the assembly plate and the retaining plate can be pre-assembled in the factory and thus a fire protection securing apparatus ready for assembly can be provided.

By fully incorporating the drive element in the closed reaction chambers, an optimal effectiveness of the drive element or intumescent material is achieved, which in particular allows a single-layered design of this relatively cost-intensive material.

BRIEF DESCRIPTION OF THE DRAWINGS

The disclosure will now be explained further on the basis of an exemplary embodiment, in which is shown.

DETAILED DESCRIPTION OF THE DRAWINGS

An exemplary embodiment of the disclosure is explained below. Unless otherwise mentioned in detail, reference is always made to all figures.

Figure 1:
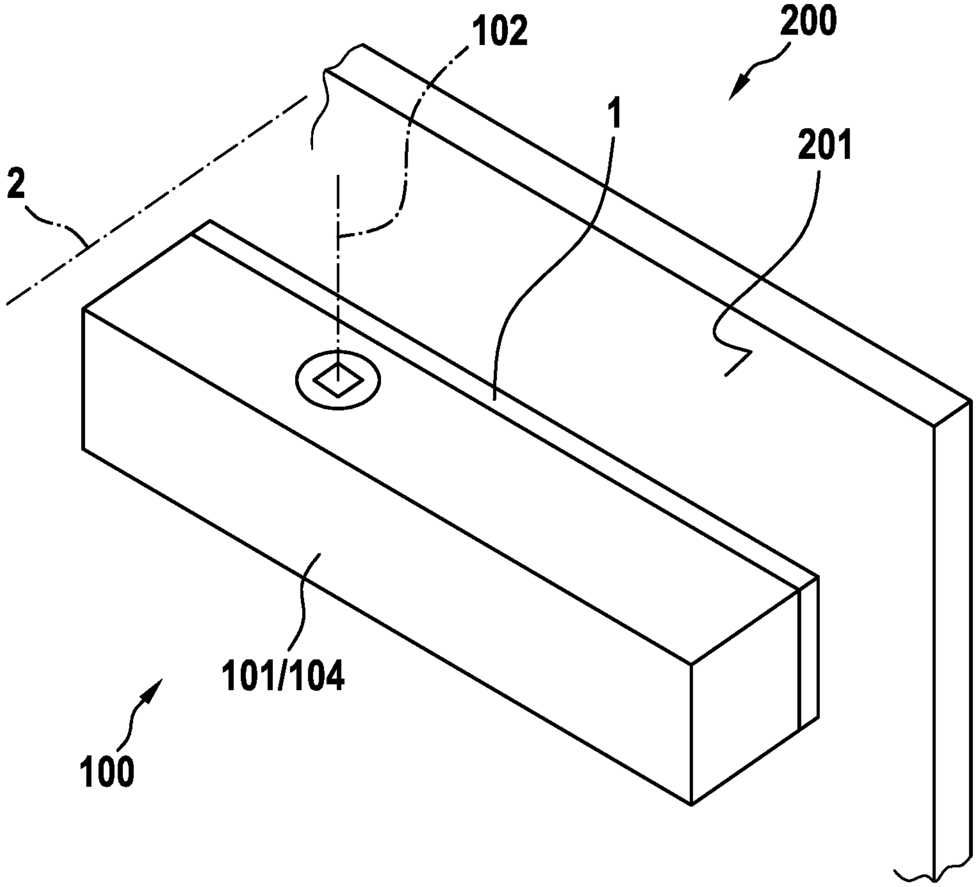
FIG. 1 a door arrangement according to the disclosure with an arrangement according to the disclosure and a fire protection securing apparatus according to the disclosure in accordance with an exemplary embodiment, FIG. 2 the arrangement according to the disclosure with a fire protection securing apparatus according to the disclosure in accordance with the exemplary embodiment, FIG. 3 the arrangement according to the disclosure with a fire protection securing apparatus according to the disclosure without a covering, FIG. 4 an exploded illustration of the fire protection securing apparatus according to the disclosure in accordance with the exemplary embodiment, FIG. 5 a perspective view of the fire protection securing apparatus according to the disclosure in accordance with the exemplary embodiment, FIG. 6 the section A-A marked in FIG. 5, and FIG. 7 the section B-B marked in FIG. 5.

FIG. 1 shows a door arrangement 200 with an assembly surface 201. In the exemplary embodiment shown, the assembly surface 201 is formed by the door, in particular the door leaf. Perpendicular to this assembly surface 201, an assembly axis 2 is defined.

Figure 3:
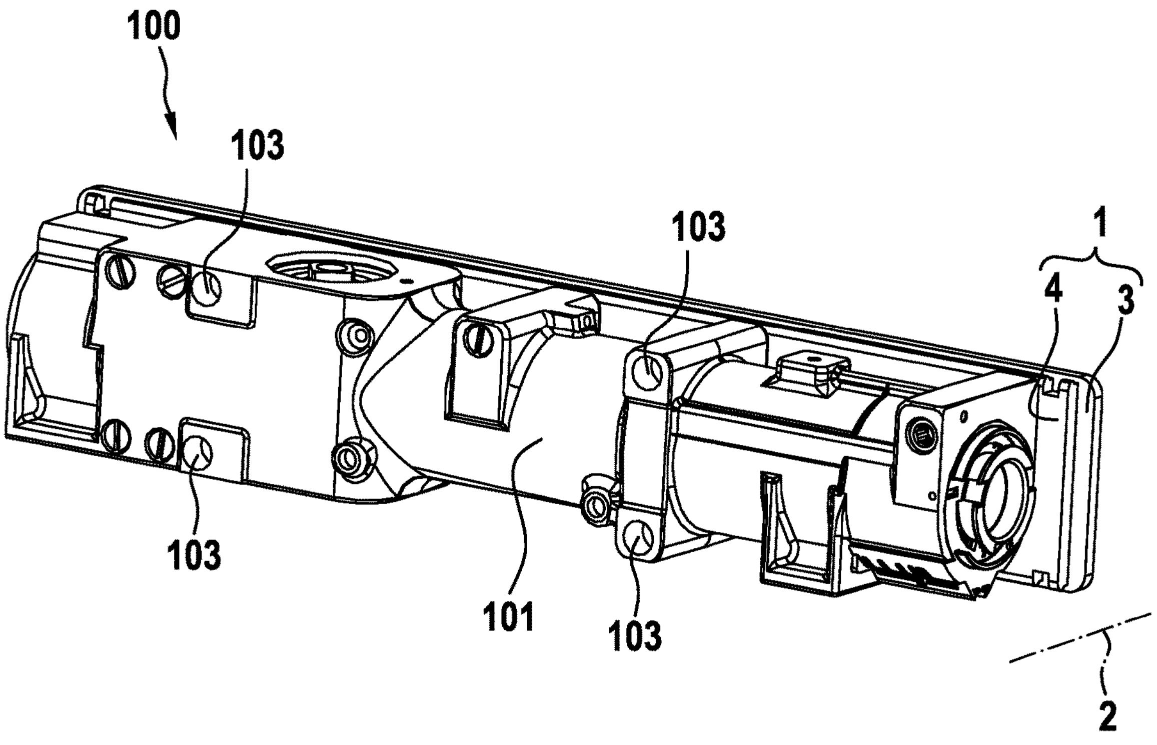

An arrangement 100 is part of the door arrangement 200. The arrangement 100 in turn comprises a door actuator 101 and a covering 104. The door actuator 101 without covering 104 is illustrated in FIG. 3. The door actuator 101 in the exemplary embodiment is a hydraulic door closer. The door actuator 101 has a driven axis 102. The door actuator 101 can be connected, for example to the frame, by means of a linkage, via this driven axis 102.

A fire protection securing apparatus 1 is another part of the arrangement 100.

FIG. 3 shows the arrangement 100 without the covering 104. The housing of the door actuator 101, in which four door actuator screw holes 103 are designed, can be seen. The door actuator 101 is screwed to the fire protection securing apparatus 1, in particular to its assembly plate 4, via these door actuator screw holes 103. These door actuator screw holes 103 extend parallel to the assembly axis 2.

Figure 2:
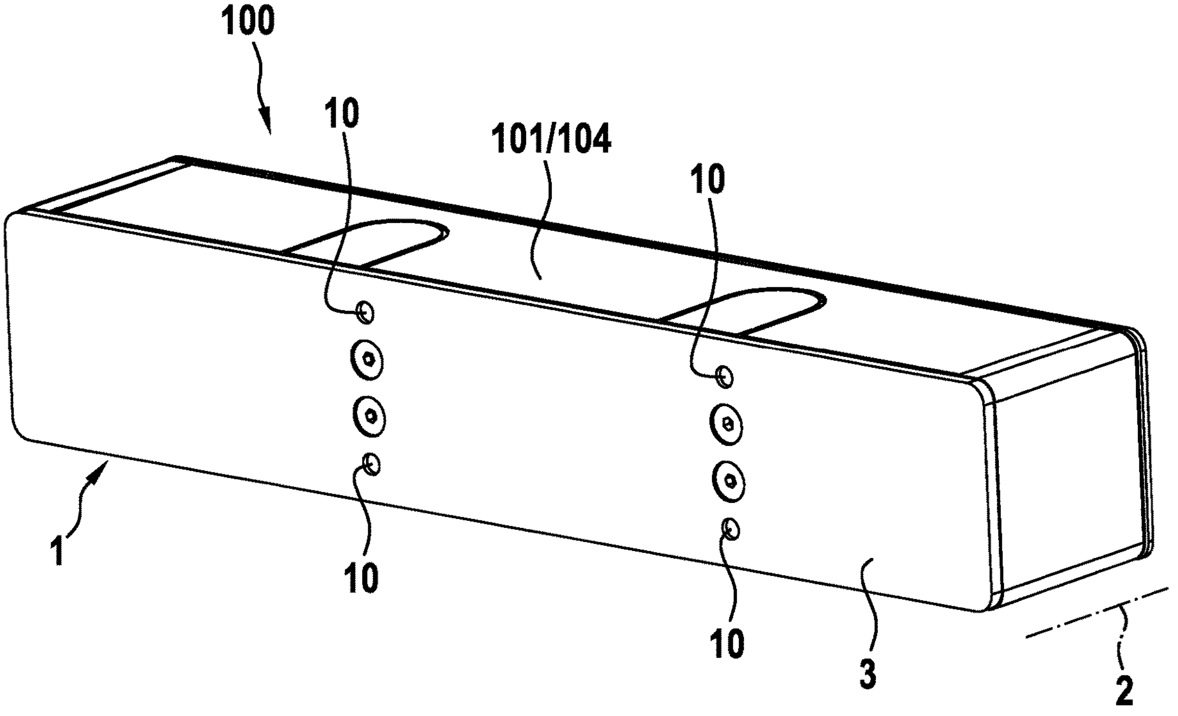

FIG. 2 shows the arrangement 100 from the rear side. A retaining plate 3 of the fire protection securing apparatus 1 can be seen. The surface of the retaining plate 3 illustrated here is to be turned towards the assembly surface 201.

Figure 4:
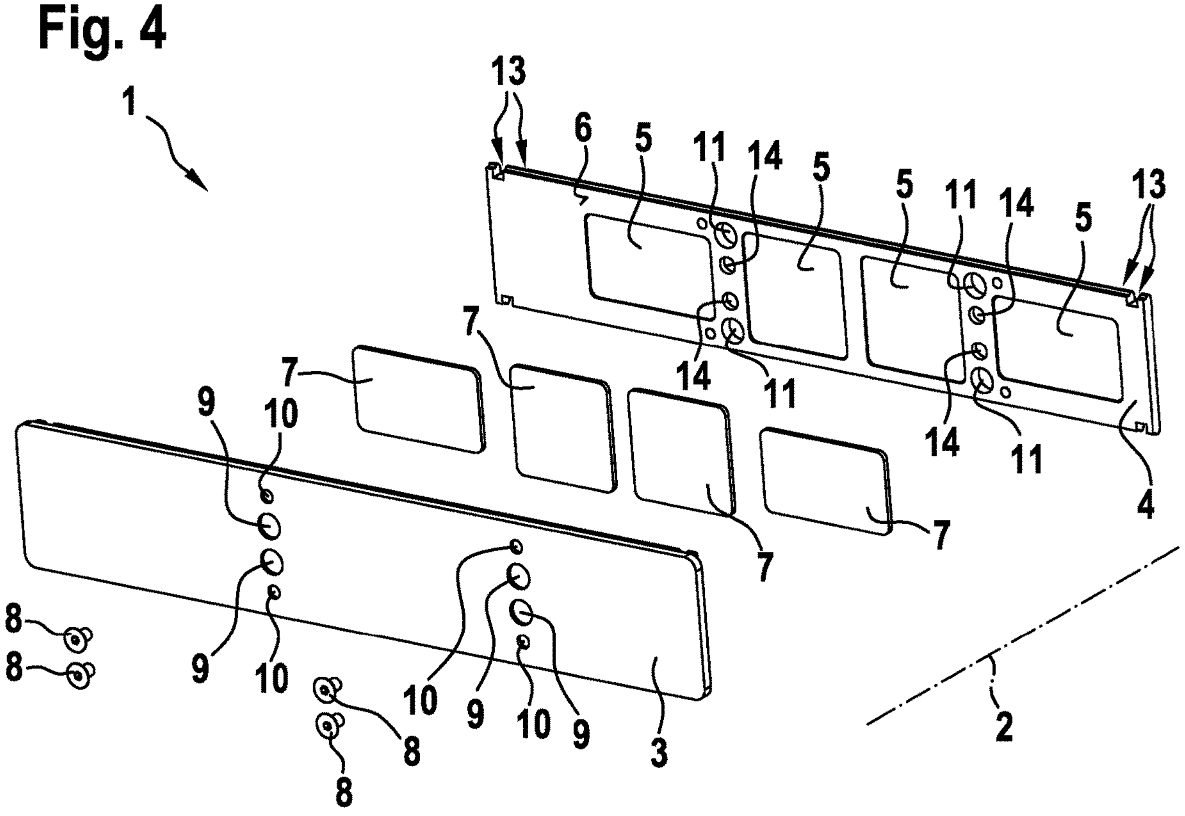
Figure 5:
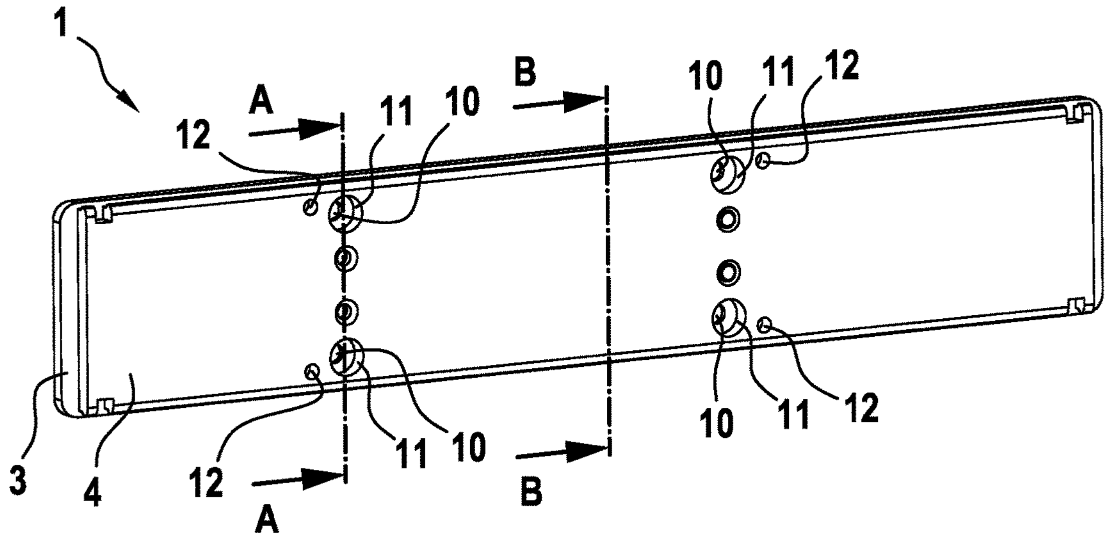
Figure 6:
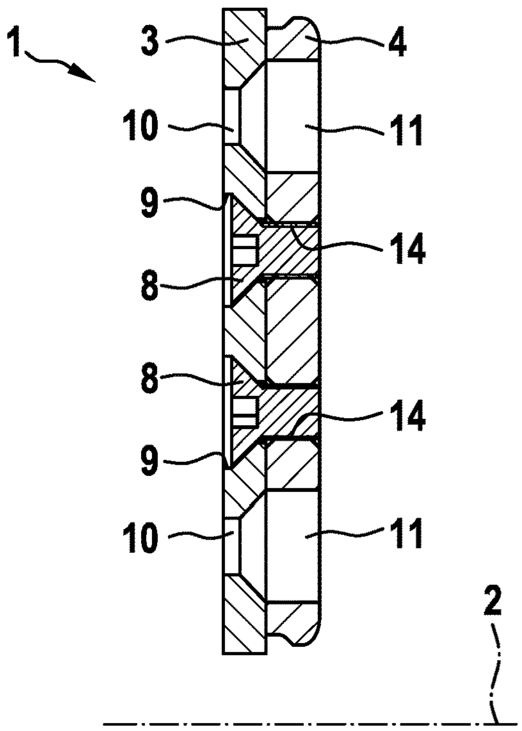
Figure 7:
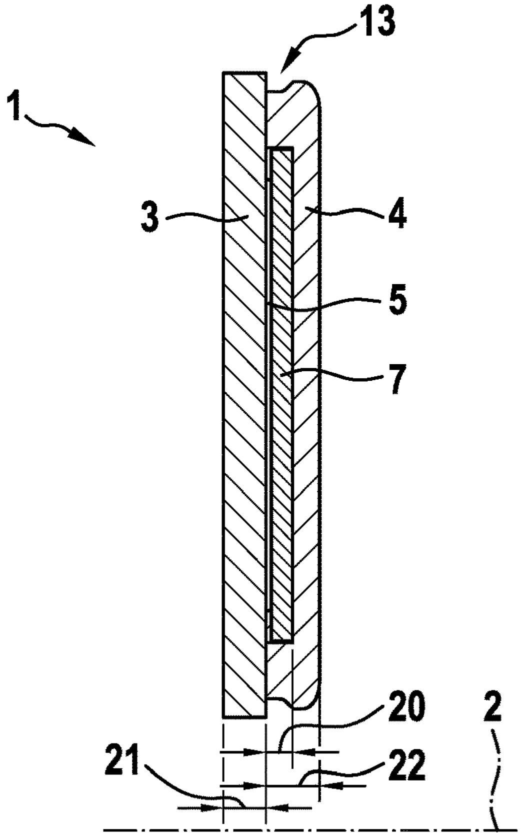

The precise design of the fire protection securing apparatus 1 can be found in the exploded illustration in FIG. 4 and the isometric illustration in FIG. 5 with the two sections in FIGS. 6 and 7.

The fire protection securing apparatus 1 is formed by two plates bearing against one another and secured to one another, namely the retaining plate 3 and the assembly plate 4. Four reaction chambers 5 are designed between retaining plate 3 and assembly plate 4. In the exemplary embodiment shown, the respective reaction chamber 5 is formed by a pocket in the assembly plate 4. The respective pocket is fully sealed by placing the retaining plate 3 thereon such that a closed reaction chamber 5 results.

The assembly plate 4 has a contact surface 6 around the reaction chambers 5 or pockets. The assembly plate 4 contacts the retaining plate 3 with this contact surface 6.

A drive element 7 of thermally intumescent material is located in each reaction chamber 5. In the exemplary embodiment shown, a layer of this material is laid for each reaction chamber 5.

The retaining plate 3 is connected to the assembly plate 4 by means of four connecting elements 8, here designed as countersunk screws. To this end, the retaining plate 3 has retaining plate screw holes 9, through which the connecting elements 8 are inserted. Aligned therewith, connecting element receptacles 14 in the form of holes with inner thread are provided in the assembly plate 4.

Four first securing points 10 in the form of holes for receiving screw heads are provided for securing the retaining plate 3 to the assembly surface 201. In particular, FIGS. 5 and 6 illustrate that the first securing points 10 in the retaining plate 3 align with associated recesses 11 in the assembly plate 4. These recesses 11 enable accessibility to the first securing points 10 and insertion of screws without these screws incorporating the assembly plate 4 into this securing process.

Four second securing points 12 in the form of holes with inner thread are provided for securing the door actuator 101 to the assembly plate 4. These securing points 12 align with the door actuator screw holes 103 (see FIG. 3).

The assembly plate 4 has on its circumference a form-locking contour 13, which is designed to secure the covering 104 to the assembly plate 4. As in particular FIG. 2 illustrates, the covering 104 surrounds the assembly plate 4 such that only the retaining plate 3 is visible externally.

FIG. 7 shows a depth 20 of the reaction chambers 5, a thickness 21 of the retaining plate 3 and a thickness 22 of the assembly plate 4. Advantageous dimensions of this depth or of these thicknesses are defined in the general part of the description.

The invention claimed is:

1. A fire protection securing apparatus for securing a door actuator, the fire protection securing apparatus comprising:
- a retaining plate configured for being secured to an assembly surface, wherein, perpendicular to the retaining plate, an assembly axis is defined,
- an assembly plate which is secured to the retaining plate configured for receiving the door actuator,
- a closed reaction chamber arranged between the retaining plate and the assembly plate, and
- a drive element of thermally intumescent material, which is arranged in the closed reaction chamber and which is configured to push the assembly plate away from the retaining plate upon thermal activation, wherein the drive element comprises only the thermally intumescent material, and only the thermally intumescent material is arranged in the closed reaction chamber.

2. The fire protection securing apparatus according to claim 1, wherein the closed reaction chamber is formed by a pocket in the assembly plate open towards the retaining plate and/or by a pocket in the retaining plate open towards the assembly plate.

3. The fire protection securing apparatus according to claim 1, wherein the closed reaction chamber has a depth parallel to the assembly axis, wherein at least 50% of the depth of the closed reaction chamber is positioned in the assembly plate.

4. The fire protection securing apparatus according to claim 1, wherein the retaining plate and the assembly plate bear directly against one another.

5. The fire protection securing apparatus according to claim 1, wherein the retaining plate and the assembly plate are connected to one another by at least one connecting element.

6. The fire protection securing apparatus according to claim 1, wherein the retaining plate has first securing points, for screwing to the assembly surface.

7. The fire protection securing apparatus according to claim 6, wherein the assembly plate has recesses, through which the first securing points of the retaining plate are accessible.

8. The fire protection securing apparatus according to claim 1, wherein the assembly plate has second securing points, for screwing on the door actuator.

9. The fire protection securing apparatus according to claim 1, wherein the retaining plate extends perpendicular to the assembly axis over a first cross-sectional area and wherein the assembly plate extends perpendicular to the assembly axis over a second cross-sectional area, wherein a ratio of the first cross-sectional area to the second cross-sectional area is between 0.7 and 1.3.

10. The fire protection securing apparatus according to claim 1, wherein a thickness of the retaining plate defined parallel to the assembly axis is, at the thickest point, between 1 mm and 20 mm, and/or wherein a thickness of the assembly plate defined parallel to the assembly axis is, at the thickest point, between 1 mm and 30 mm.

11. The fire protection securing apparatus according to claim 1, wherein the drive element extends over an entire cross-sectional area of the closed reaction chamber defined perpendicular to the assembly axis.

12. An arrangement comprising a door actuator and a fire protection securing apparatus comprising a retaining plate configured for being secured to an assembly surface, wherein, perpendicular to the retaining plate, an assembly axis is defined, an assembly plate which is secured to the retaining plate configured for receiving the door actuator, a closed reaction chamber arranged between retaining plate and assembly plate, and a drive element of thermally intumescent material, which is arranged in the closed reaction chamber and which is configured to push the assembly plate away from the retaining plate upon thermal activation, wherein the drive element comprises only the thermally intumescent material, and only the thermally intumescent material is arranged in the closed reaction chamber, wherein the door actuator is configured to be arranged on the assembly plate.

13. The arrangement according to claim 12, comprising a covering, which covers the door actuator and which is configured for being secured directly to the assembly plate.

14. A door arrangement, comprising an assembly surface, and an arrangement according to claim 13, wherein the retaining plate is configured for being secured to the assembly surface.

* * * * *